United States Patent
Hosoe et al.

(10) Patent No.: US 7,418,559 B2
(45) Date of Patent: Aug. 26, 2008

(54) ADDRESS SNOOP METHOD AND MULTI-PROCESSOR SYSTEM

(75) Inventors: Koji Hosoe, Kawasaki (JP); Kouichi Odahara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 350 days.

(21) Appl. No.: 11/259,605

(22) Filed: Oct. 27, 2005

(65) Prior Publication Data

US 2006/0200633 A1  Sep. 7, 2006

(30) Foreign Application Priority Data

Mar. 7, 2005 (JP) ............................ 2005-062661

(51) Int. Cl.
*G06F 12/00* (2006.01)
(52) U.S. Cl. ...................... 711/146; 711/119; 711/141; 710/18
(58) Field of Classification Search ................. 711/146
See application file for complete search history.

(56) References Cited

U.S. PATENT DOCUMENTS

| 5,923,898 | A | 7/1999 | Genduso et al. | |
|---|---|---|---|---|
| 6,622,214 | B1 * | 9/2003 | Vogt et al. | 711/141 |
| 6,631,447 | B1 * | 10/2003 | Morioka et al. | 711/141 |
| 6,810,467 | B1 | 10/2004 | Khare et al. | |
| 7,222,220 | B2 * | 5/2007 | Cypher et al. | 711/141 |
| 2005/0240736 | A1 * | 10/2005 | Shaw | 711/146 |

FOREIGN PATENT DOCUMENTS

| CN | 1571958 A | 1/2005 |
|---|---|---|
| JP | 09-138782 | 5/1997 |
| JP | 09-138783 | 5/1997 |
| JP | 2001-184321 | 7/2001 |
| KR | 1998-086620 | 12/1998 |
| KR | 2003-25296 | 3/2003 |
| WO | WO 02/17102 | 2/2002 |

OTHER PUBLICATIONS

First Notification of Office Action issued by the State Intellectual Property Office of China on May 25, 2007 in the corresponding Chinese Patent Application No. 200510127445.7 (6 pages) (English translation 10 pages).
Korean Office Action issued Nov. 17, 2006 by the Korean Patent Office in Korean Application No. 10-2005-116205 corresponding to the present above-identified U.S. patent application, including a Japanese translation of Korean Office Action.

* cited by examiner

*Primary Examiner*—Kevin Ellis
*Assistant Examiner*—Hashem Farrokh
(74) *Attorney, Agent, or Firm*—Staas & Halsey LLP (57) ABSTRACT

Address snoop methods and multi-processor systems to enable easy implementation of a large number of I/O blocks in the multi-processor system, independently of processor blocks, and to prevent the upper limit of the performance of the multi-processor system from deteriorating (prevent latency from increasing). An address snoop method for a multi-processor system having a structure in which a plurality of processor blocks each having a plurality of processors and a plurality of memories are coupled to a plurality of input and output (I/O) blocks via an address connecting apparatus, is configured to carry out an address snoop process that judges whether to respond with respect to an access request, in the address connecting apparatus in place of each I/O block, when the access request is generated from an arbitrary one of the processor blocks.

14 Claims, 5 Drawing Sheets

FIG. 5

ADDRESS SNOOP METHOD AND MULTI-PROCESSOR SYSTEM

CROSS-REFERENCE TO RELATED APPLICATIONS

This application claims the benefit of Japanese Application No. 2005-062661, filed Mar. 7, 2005, in the Japan Patent Office, the disclosure of which is incorporated herein by reference.

BACKGROUND OF THE INVENTION

1. Field of the Invention

The present invention generally relates to address snoop methods and multi-processor systems, and more particularly to an address snoop method for carrying out an address snoop process in a multi-processor system in which a plurality of processor blocks are coupled to a plurality of input and output (I/O) blocks via a connecting apparatus, and to a multi-processor system which employs such an address snoop method.

2. Description of the Related Art

A multi-processor system has a structure in which a plurality of processor blocks and a plurality of I/O blocks are coupled via a connecting apparatus also referred to as data and address crossbars. Each processor block includes a plurality of processors and a plurality of memories. On the other hand, each I/O block includes a storage unit such as a disk drive. In the following description, it will be assumed for the sake of convenience that each processor block is formed by a CPU block that has a plurality of CPUs and a plurality of cache memories.

In the conventional multi-processor system, the I/O block is provided in a 1:1 relationship to the CPU block or, even, if a plurality of I/O blocks are independent, a small number of I/O blocks can be shared by a plurality of CPU blocks. However, the number of accesses among the cache memories increases proportionally to the number of CPU blocks, and increasing the number of CPU blocks does not necessarily improve the performance of the multi-processor system. Accordingly, a system has been proposed to improve the performance of the multi-processor system by interconnecting the CPU blocks via the I/O blocks.

However, even when such a proposed system is employed, if the number of I/O blocks per CPU block is in a 1:1 ratio as in the case of the conventional multi-processor system or, the I/O blocks are shared by a plurality of CPU blocks, the performance of the multi-processor system is greatly restricted, thereby eliminating the significance of employing such a proposed system.

For this reason, there are demands to realize a structure which can implement a large number of I/O blocks, increase the number of I/O blocks usable by each CPU block, and use the CPU blocks and the I/O blocks in a flexible combination.

For example, a Japanese Laid-Open Patent Application No. 9-138782 proposes a multi-processor system having a structure in which a memory access output by a processor unit is monitored by other cache memories using the interconnected network. On the other hand, Japanese Laid-Open Patent Application No. 9-138783 proposes a multi-processor system having a mechanism that simultaneously executes a plurality of unicastings having different transfer destination ports. In addition, Japanese Laid-Open Patent Application No. 2001-184321 proposes a multi-processor system coupled via a node interconnecting network.

When a large number of I/O blocks are implemented in the multi-processor system, independently of the CPU blocks and the CPU blocks and the I/O block communicable connect by data and address crossbars, it becomes necessary to separately snoop the address in each I/O block. In other words, conventionally each I/O block includes address snoop circuitry and/or programmable logic. In this case, it is necessary to supply a signal required for an address snoop process from the address connecting apparatus (or address crossbar) to each I/O block. However, in order to supply the signal required for the address snoop process to each I/O block, it is necessary to take implementation measures, such as increasing the number of pins of the address connecting apparatus per LSI and dividing the functions of a plurality of LSIs, thereby introducing problems in that the implementation is difficult and that the cost increases. In addition, because of the structure of the multi-processor system (particularly the address connecting apparatus and the I/O blocks), a wiring length increases and a transmission delay is generated, thereby introducing a problem in that the upper limit of the performance of the multi-processor system deteriorates (latency increases).

SUMMARY OF THE INVENTION

Accordingly, the present invention provides an address snoop method and a multi-processor system, which enable (as unlimiting examples) easy implementation of a large number of I/O blocks in the multi-processor system, independently of the processor blocks, and prevent the upper limit of the performance of the multi-processor system from deteriorating (prevent latency from increasing).

Additional aspects and advantages of the invention will be set forth in part in the description which follows and, in part, will be obvious from the description, or may be learned by practice of the invention.

An address snoop method for a multi-processor system having a structure in which a plurality of processor blocks each comprising a plurality of processors and a plurality of memories are coupled to a plurality of input and output (I/O) blocks via an address connecting apparatus or address crossbar, is characterized by carrying out an address snoop process that judges whether to respond to a processor with a response equivalent to a response by each I/O block with respect to an access request, in the address connecting apparatus in place of (instead on each I/O block, when the access request is generated from an arbitrary one of the processor blocks.

According to an aspect of the present invention, an address snoop method is characterized in that a number of address snoop circuits that carry out the address snoop process, corresponding to a number of said I/O blocks, is provided within the address connecting apparatus; and each partition is formed by at least one processor block, at least one I/O block, and each address snoop circuit corresponding to said at least one I/O block.

A multi-processor system having a structure in which a plurality of processor blocks each comprising a plurality of processors and a plurality of memories are coupled to a plurality of input and output (I/O) blocks via an address connecting apparatus, is characterized by carrying out an address snoop process that judges whether to respond with respect to an access request, in the address connecting apparatus in place of each I/O block, when the access request is generated from an arbitrary one of the processor blocks.

According to an aspect of the present invention, a multi-processor system is characterized in that a cache status generating means outputs a no hit response to said arbitrary one of the processor blocks, as a cache status, if said arbitrary one of the I/O blocks does not need to respond; and outputs a hit response to said arbitrary one of the processor blocks, as a cache status, if said arbitrary one of the I/O blocks needs to respond.

According to an aspect of the present inventions, a multi-processor system is characterized in that the cache status generating means judges whether an access prohibit from other processor blocks exists, with respect to the cache status making the hit response with respect to said arbitrary one of the I/O blocks; and generates a request for said arbitrary one of the I/O blocks and outputting the generated request to said arbitrary one of the I/O blocks if no access prohibit from the other processor blocks exists.

According to an aspect of the present invention, a multi-processor system is characterized in that the address connecting apparatus has means for holding the data or, copying and holding the data, within the address connecting apparatus, if the generated request is a configuration access that includes the data related to the address snoop process, and thereafter carrying out the address snoop process according a new setting made by the data that is held.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Reference will now be made in detail to the present embodiments of the present invention, examples of which are illustrated in the accompanying drawings, wherein like reference numerals refer to the like elements throughout. The embodiments are described below to explain the present invention by referring to the figures.

According to the present invention, it is possible to easily implement a large number of I/O blocks in the multi-processor system, independently of the processor blocks, and to prevent the upper limit of the performance of the multi-processor system from deteriorating (prevent latency from increasing).

In an I/O block of a general multi-processor system, a cache memory that needs to maintain consistency in the entire multi-processor system is normally not implemented. Hence, a process of generating an I/O address cache status for responding with respect to a snooped address is simple compared to a cache memory access of a processor block. The present invention focuses on this point, and holds in an address connecting apparatus, as a snoop I/O address cache, a copy of information required to generate a snoopable I/O address status for the I/O block, and carries out an address snoop process with respect to the I/O block in the address connecting apparatus in place of or instead of the I/O block. Therefore the term cache herein refers to providing a cache of I/O address snoop status information (i.e., a cache for I/O address snooping) in a connecting apparatus, such as an address crossbar, of a multiprocessor system in which a processor block and an I/O block communicably connect by the connecting apparatus. A multi-processor system having a structure in which a plurality of processor blocks each comprising a plurality of processors and a plurality of memories are coupled to a plurality of input and output (I/O) blocks via an address connecting apparatus, is characterized by carrying out an address snoop process that judges, in the address connecting apparatus in place of each I/O block, whether to respond to a processor with a snoop address response equivalent to a snoop address response by each I/O block with respect to an access request, when the access request is generated from an arbitrary one of the processor blocks.

The I/O block is notified of the address only when an access request with respect to this I/O block becomes definite, so that the number of connecting terminals between the I/O block and the address connecting apparatus can be reduced. In other words, a multi-processor system connectable to a large number of I/O blocks can be realized without increasing the number of pins per LSI within the address connecting apparatus and the I/O blocks. Accordingly, since the number of connecting terminals, the number of wirings and the lengths of the wirings between the address connecting apparatus and the I/O block can be reduced, it is possible to realize both the connection of a large number of I/O blocks, and the high-density implementation and reduced transmission delay realized thereby.

Figure 1:
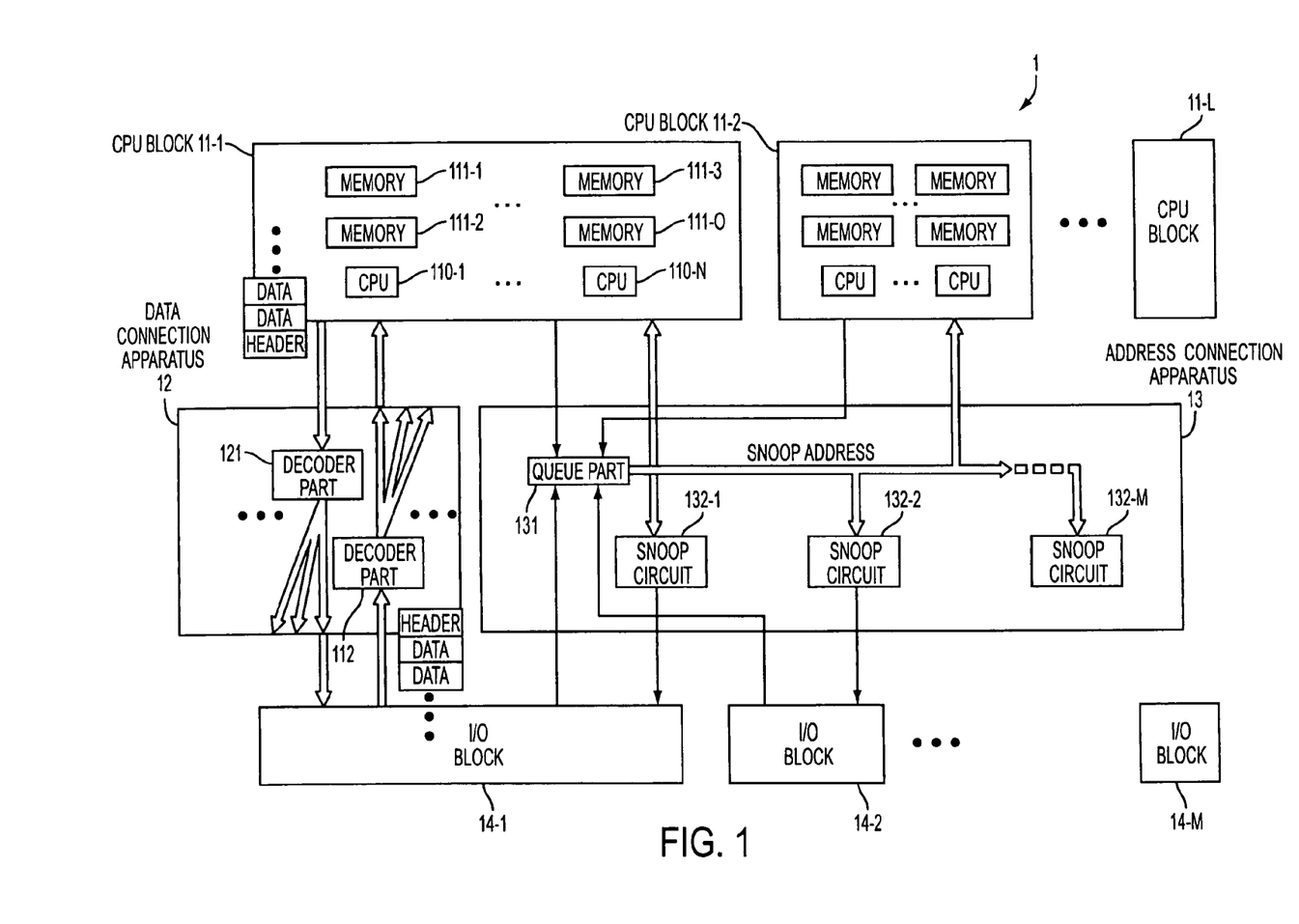
FIG. 1 is a block diagram of a multi-processor system, according to an embodiment of the present invention.

FIG. 1 is a block diagram of a multi-processor system, according to an embodiment of the present invention. This embodiment of the multi-processor system employs an embodiment of the address snoop method according to the present invention. In FIG. 1, a multi-processor system 1 includes a plurality of CPU blocks 11-1 through 11-L, a data connecting apparatus or data crossbar 12, an address connecting apparatus or address crossbar 13, and a plurality of I/O blocks 14-1 through 14-M, where typically L and M are integers greater than or equal to 2. In this embodiment, it is assumed for the sake of convenience that L=M=8.

Each CPU block 11-i (i=1 to L) has a known structure including a plurality of CPUs 110-1 through 110-N, a plurality of cache memories 111-1 through 111-O and the like, where typically N and O are integers greater than or equal to 2. In this embodiment, it is assumed for the sake of convenience that N=2 and O=4. The illustration of a cache control part and the like is omitted in FIG. 1.

The data connecting apparatus 12 has a known structure for controlling exchange of data between the CPU blocks 11-1 through 11-L and the I/O blocks 14-1 through 14-M, and includes decoder parts 121 and 122 and the like.

The address connecting apparatus 13 has a structure for controlling exchange of addresses between the CPU blocks 11-1 through 11-L and the I/O blocks 14-1 through 14-M, and includes a queue part 131, M snoop circuits 132-1 through 132-M and the like. A more detailed description related to the structure of the address connecting apparatus 13 will be given later in conjunction with FIG. 3.

Each of the I/O blocks 14-1 through 14-M has a known structure including a storage unit, such as a disk drive, and the like.

According to the embodiments of the present invention, all of the address snoop control processes with respect to each of the I/O blocks 14-1 through 14-M are carried out within the address connecting apparatus 13 instead of in the respective I/O blocks 14-1 through 14-M. In addition, since the snoop circuits 132-1 through 132-M are provided within the address connecting apparatus 13, the address connecting apparatus 13 and the I/O blocks 14-1 through 14-M are connected via a small number of wirings compared to the case where the snoop circuit is provided within each of the I/O blocks 14-1 through 14-M.

The data connecting apparatus 12 and the address connecting apparatus 13 connect in parallel the CPU blocks 11 and the I/O blocks 14. The data for which a transfer destination has become definite in the address connecting apparatus 13 is sent to the transfer destination via the data connecting apparatus 12. The data transferred on a bus between each of the CPU blocks 11-1 through 11-L and the data connecting apparatus 12, and the data transferred on a bus between each of the I/O blocks 14-1 through 14-M and the data connecting apparatus 12, both have a data structure comprising a header and a data part (or main data part). The data written in the data part subsequent to the header is transferred according to the transfer destination and the data length written in the header.

In the multi-processor system 1 having the structure described above, the data connecting apparatus 12 and the address connecting apparatus 13 connect not only the CPU blocks 11-1 through 11-L and the I/O blocks 14-1 through 14-M, but also connect the CPU blocks 11-1 through 11-L with each other and also connect the I/O blocks 14-1 through 14-M with each other.

Figure 2:
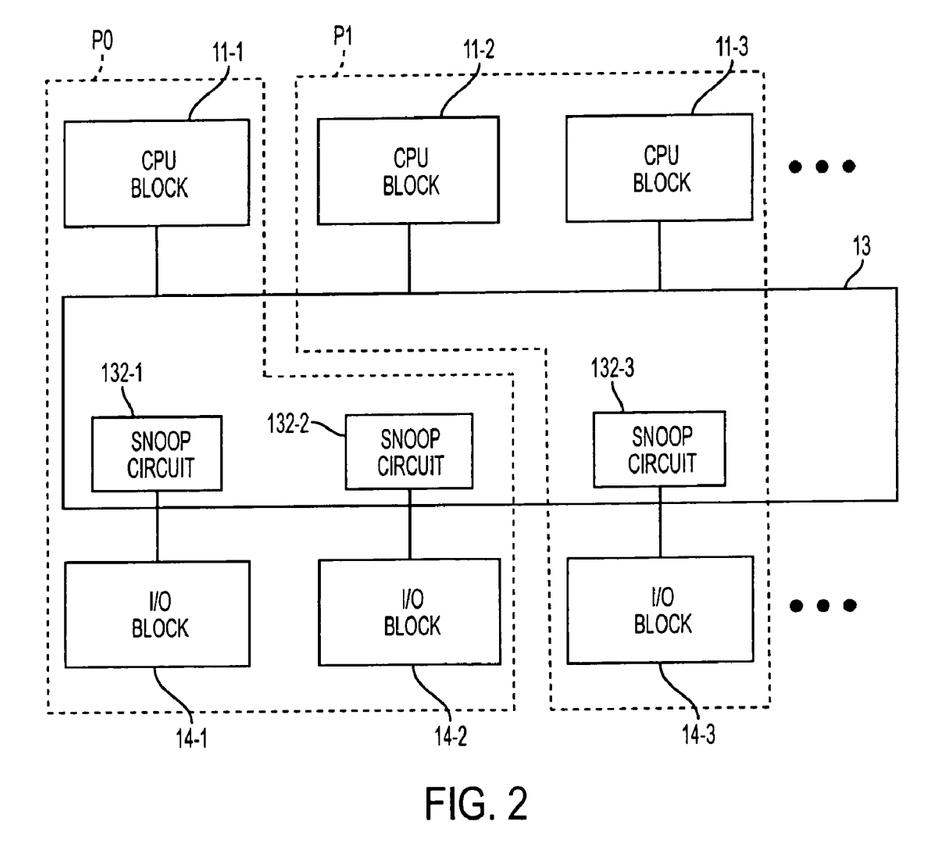
FIG. 2 is a diagram for explaining a partition structure of a multi-processor system, according to an embodiment of the present invention.

FIG. 2 is a diagram for explaining a partition structure of the multi-processor system 1, according to an embodiment of the present invention. In FIG. 2, those parts which are the same as those corresponding parts in FIG. 1 are designated by the same reference numerals, and a description thereof will be omitted. Each of the CPU blocks 11-1 through 11-L and each of the I/O blocks 14-1 through 14-M can form a partition by an arbitrary combination thereof. Typically, no access is made between different partitions. FIG. 2 shows a case where a partition P0 is formed by a combination of the CPU block 11-1 and the I/O blocks 14-1 and 14-2, and a partition P1 is formed by a combination of the CPU blocks 11-2 and 11-3 and the I/O block 14-3. The two corresponding snoop circuits 132-1 and 132-2 within the address connecting apparatus 13 are included in the partition P0, and the corresponding one snoop circuit 132-3 within the address connecting apparatus 13 is included in the partition P1.

Because the snoop circuits 132-1 through 132-M are provided within the address connecting apparatus 13, even though the address connecting apparatus 13 and the I/O blocks 14-1 through 14-M can be connected, for example, via a smaller wirings (fewer wires and shorter wires) compared to the case where the snoop circuit is provided within each of the I/O blocks 14-1 through 14-M, it is possible to select the combination of the CPU blocks and the I/O blocks forming the partition with a large degree of freedom.

Figure 3:
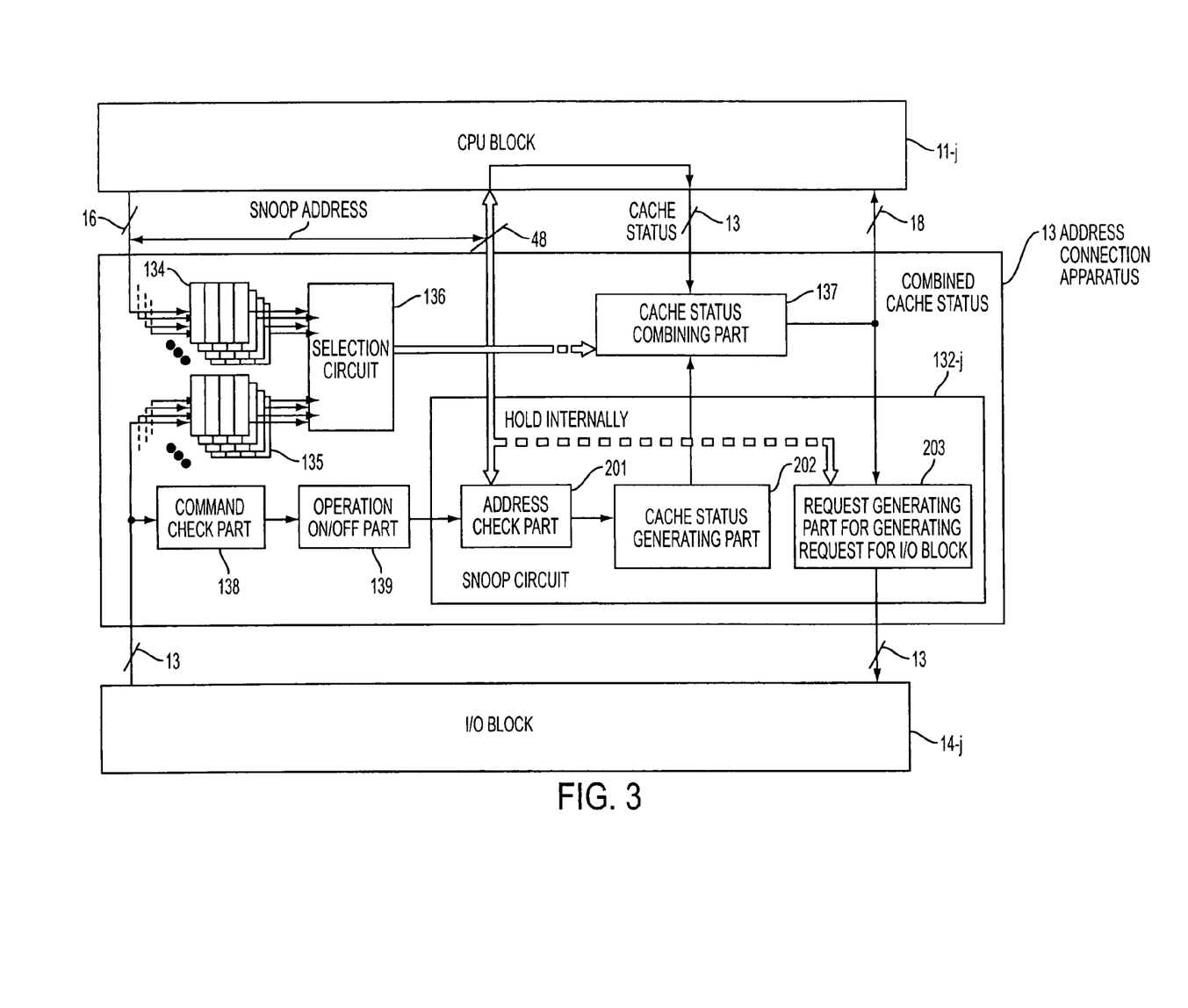
FIG. 3 is block diagram showing a structure of an address connecting apparatus including an address snoop circuit, according to an embodiment of the present invention.

FIG. 3 is a block diagram showing a structure of an address connecting (connection) apparatus including an address snoop circuit 132-j, according to an embodiment of the present invention. For the sake of convenience, FIG. 3 shows an important part of the address connecting apparatus or address crossbar 13 related to an arbitrary CPU block 11-j and an arbitrary I/O block 14-j. As shown in FIG. 3, the address connecting apparatus 13 includes the snoop circuit 132-j, buffers 134 and 135, a selection circuit 136, a cache status combining part 137, a command check part 138 and an operation ON/OFF part 139. The buffers 134 and 135 and the selection circuit 136 form the queue part 131 shown in FIG. 1.

The snoop circuit 132-j includes an address check part 201, a cache status generating part 202 and a request generating part 203 for generating an access request to the I/O block 14.

In this embodiment, one CPU block 11-j and the address connecting apparatus 13 are connected via signal lines (including ECC) having a bit width of 95 bits, for example. Of the 95 bits, 16 bits are for the snoop address input to the address connecting apparatus 13, 48 bits are for the snoop address output to the CPU block 11-j, 13 bits are for the cache status to the address connecting apparatus 13 from the CPU block 11-j, and 18 bits are the combined cache status to the CPU block 11-j. On the other hand, one I/O block 14-j and the address connecting apparatus 13 are connected via signal lines (including ECC) having a bit width of 26 bits, for example. Of the 26 bits, 13 bits are for the address input to the address connecting apparatus 13 from the I/O block 14-j, and 13 bits are for the access request input to the I/O block 14-j from the address connecting apparatus 13.

Basically, according to the present invention, the structure is such that the snoop circuit 132-j is provided within the address connecting apparatus 13 and not within the I/O block 14-j, providing center address snooping. In addition, a function of notifying an I/O block 14-j of an access request that has become definite is added to the snoop circuit 132-j. The center address snoop cache of the present invention can be implemented in software, programmable computing hardware, or hardware/devices for processing information, including any forms of circuits, data storage (for example, memory, registers, etc.), or any combinations thereof.

The addresses input from the CPU block 11-j and the I/O block 14-j are temporarily stored in queues within the corresponding buffers 134 and 135 for each CPU and I/O block 11, 14. These addresses are successively selected by the selection circuit 136, and broadcast as snoop addresses to all of the CPU blocks 11-1 through 11-L and the snoop circuits 132-1 through 132-M included within the address connecting apparatus 13. The CPU block 11-j obtains from the broadcasted snoop address the information required for generating an access (read/write) request to the I/O blocks 14 via the data connecting apparatus 12.

According to the present invention, typical information required by the I/O block 14-j to carry out a snoop process can be generated by storing a snoop address within the snoop circuit 132-j of the address connecting apparatus 13. With regard to the access request addressed to the I/O block 14-j by the address connecting apparatus 13 via the request generating part 203, it is sufficient to send to the I/O block 14 only the necessary address information part by excluding any unnecessary commands, so that it is unnecessary to send the entire snoop address that might include unnecessary commands and/or data, because the snoop circuit 132 (for example, address check part 201) checks an address range and a command type input to the address connecting apparatus 11 from the CPU block 11 as part of the center snoop process to respond to the CPU block 11 in place of a response by the I/O block 14. Therefore, according to an aspect of the invention, the address connecting apparatus 13 can send only relevant commands by excluding unnecessary commands to the I/O block 14. However, because of center snooping and transferring only definite access requests to the I/O block 14, since the percentage of the accesses that require processing in the I/O block 14-j is small in relation to all of the accesses, it can be desirable to use a general command format that can simultaneously include the data of all of the commands that have a possibility of being sent to the I/O block 14-j, so as to simplify matters. The I/O block 14-j can receive the access requests having several kinds of command formats, but a general command is made up of information having 160 bits. Such a general command is transferred between the address connecting apparatus 13 and the I/O block 14-j in 10 cycles, for example. When the command is transferred via a snoop address bus within the address connecting apparatus 13, the command has 150 bits, for example. Some example (without limitation) commands to the I/O block 14 can be Parallel I/O (PIO) access, Direct Memory Access (DMA) mode, configuration access, or other possible commands, or any combinations thereof.

Operation start and stop instructions with respect to the snoop circuit 132j are set according to a command that is output from the I/O block 14-j, via the command check part 138 and the operation ON/OFF part 139. This command that is output from the I/O block 14-j only sets the ON or OFF state of the snoop operation, and is not stored in the address queue within the buffer 135. The command check part 138 checks the command that is output from the I/O block 14-j, so as to judge whether the set instruction is the operation start instruction or the operation stop instruction with respect to the snoop circuit 132-j. Based on the result of the command check, the operation ON/OFF part 139 instructs the starting of the operation of the snoop circuit 132-j if the set instruction is the operation start instruction, and instructs the stopping of the operation of the snoop circuit 132-j if the set instruction is the operation stop instruction.

Figure 4:
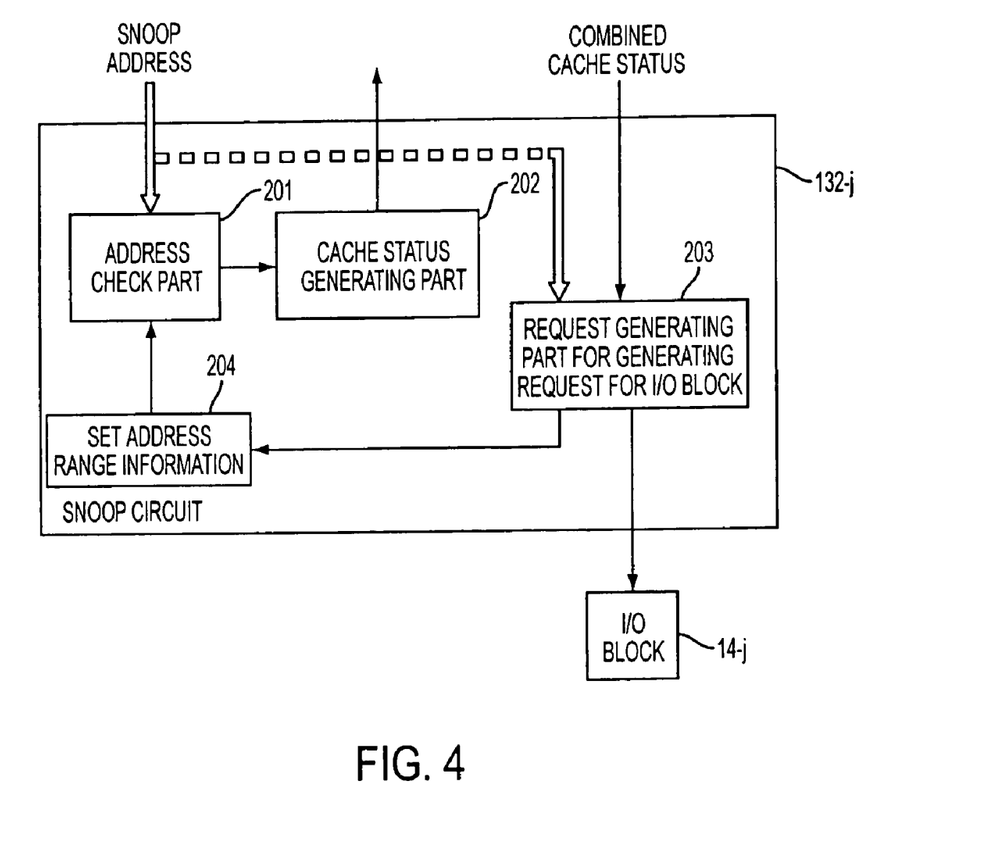
FIG. 4 is a block diagram for explaining a relationship between management software of a CPU block and an address crossbar when carrying out a configuration access, according to an embodiment of the present invention.

In the snoop circuit 132-j, based on the starting of the snooping operation which is instructed by the operation start instruction, the address check part 201 checks the input snoop address, and the cache status generating part 202 generates a state of an address cache with respect to the CPU block 11 belonging to the same partition, that is, an address cache status indicating whether the access request has hit, according to a setting of an address range allocated to the I/O block 14-j (see also FIG. 4). This cache status viewed from the I/O block 14-j is output to the cache status combining part 137. The cache status viewed from the CPU block (in this case, the CPU block 11-j and the like) belonging to the same partition as the I/O block 14-j is also returned to the cache status combining part 137.

The cache statuses are combined in the cache status combining part 137 and the combined cache status is again broadcast to all of the CPU blocks 11-1 through 11-L and all of the snoop circuits 132-1 through 132-M within the address connecting apparatus 13. The combined cache status is also input to the request generating part 203 within each of the snoop circuits 132-1 through 132-M. In a case where an access request process needs to be carried out in the I/O block 14-j, for example, the request generating part 203 of the snoop circuit 132-j within the address connecting apparatus 13 generates an access request therefore, and transfers the generated request to the I/O block 14-j.

In this case, until the cache status from the CPU block 11-j is again input or returned to the cache status combining part 137 of the address connecting apparatus 13, the snoop address is held (cached) within the snoop circuit 132 as indicated by bold dotted lines in FIG. 3. More particularly, the snoop address is held in a register within the address check part 201 or, a register within the request generating part 203 or, a register that is separately provided within the snoop circuit 132-j or, in other registers and the like, such as the cache status combining part 137. The snoop address is held because the information of the snoop address is required when the request generating part 203 within the snoop circuit 132-j finally issues the access request with respect to the I/O block 14-j. A time interval from a time when the snoop address is input until a time when the combined cache status is input is designed so that all of the CPU blocks 11-1 through 11-L have a fixed cycle.

When the data transfer is generated, the process is continued via the data connecting apparatus 12. However, since the data transfer itself is not directly related to the subject matter of the present invention and a known data transfer technique may be employed, a description thereof will be omitted in this specification.

In this embodiment, the request that is issued from the snoop circuit 132-j with respect to the I/O block 11-j has a format slightly different from the format of the input snoop address, and only the information required by the I/O block 11-j and the like can be notified to the I/O block 14, so as to reduce the number of wirings, because the snoop circuit 132 can exclude any unnecessary commands since command checking can be performed by the snoop circuit 132 in the address connecting apparatus 13. In other words, conventionally, all commands were also sent by the address connecting apparatus 13 to the I/O block 14 as part of an input snoop address so that the I/O block can perform a snooping operation. The connection from the I/O block 14-j to the address connecting apparatus 13 is made similarly, and because it is unnecessary to support commands that are not issued from the I/O block 14-j (except for the ON and OFF snoop operation command), the format is optimized to reduce the number of signals.

Next, a description will be given of a relationship between a management software of the CPU block 11 and the address connecting apparatus 13 when making a configuration access to the I/O block 14, by referring to FIG. 4. FIG. 4 is a block diagram for explaining the relationship between the management software of the CPU block and the address connecting apparatus 13 when making the configuration access to the I/O block 14, according to an embodiment of the present invention. In FIG. 4, those parts which are the same as those corresponding parts in FIG. 3 are designated by the same reference numerals, and a description thereof will be omitted.

The normal data transfer is made via the data connecting apparatus 12, but the snoop address for carrying out the configuration access has a format that includes the configuration data, such as I/O block address range, therein. According to an aspect of the present invention, management software of each of the CPU blocks 11-1 through 11-L (each of the CPUs 110-0 through 110-N) does not need to consider the structure of the address connecting apparatus 13. Conventionally, the snoop circuit is provided within the I/O block 14, and the management software carries out a configuration access that notifies the I/O block 14 of configuration information, for example, the address range with respect to each of the I/O blocks 14-1 through 14-M. But since each of the snoop circuits 132-1 through 132-M is provided within the address connecting apparatus 13 for center snooping, in this embodiment of the present invention, when the data required to carry out the center address snoop process is transferred within the snoop circuit while the CPU block 11 is notifying the I/O block 14 of the configuration information (e.g., I/O block address range information, target I/O memory address list, etc.), the configuration access information is detected and held (intercepted) or, copied and held (copy is held), for use when checking the address range thereafter as center snooping at the address connecting apparatus 13. The configuration data that is held or, copied and held, is held in the register within the address check part 201 or, the register within the request generating part 203 or, the register provided separately within the snoop circuit 132-j or, other registers and the like. FIG. 4 shows a case where the copy of the configuration data is held within the request generating part 203, and is used as address range information 204 when checking the address range in the address check part 201.

The configuration access itself with respect to the I/O blocks 14-1 through 14-M is also executed, and the I/O blocks 14-1 through 14-M hold the information of the configuration access. Therefore, according to an aspect of the present invention, the existing management software of a multi-processor system, which has a structure in which the snoop circuit is provided within the I/O block, can be used as it is along with center snooping, without having to modify the management software. According to an aspect of the invention, the configuration data may be predetermined in the address connecting apparatus 13 and I/O bock 14.

Figure 5:
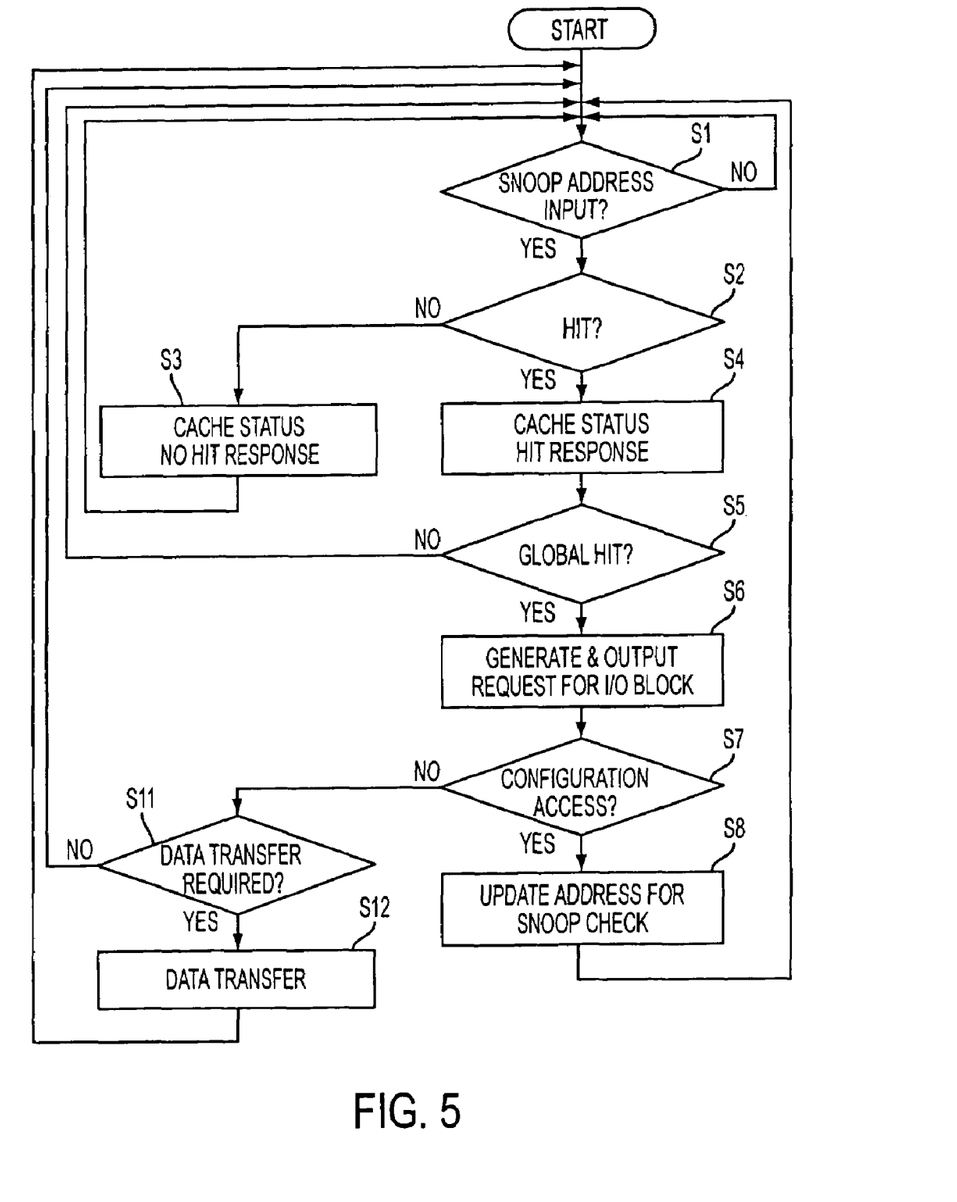
FIG. 5 is a flow chart for explaining a process of a multi-processor system, according to an embodiment of the present invention.

Next, a description will be given of a process of the multi-processor system 1, by referring to FIG. 5. FIG. 5 is a flow chart for explaining the process of the multi-processor system 1, according to an embodiment of the present invention. Although FIG. 5 shows the process with respect to one snoop address, each process actually forms a pipeline, and a plurality of snoop addresses may be transferred within one snoop circuit. In FIG. 5, steps S1 through S8 correspond to a process that is executed by the snoop circuit 132, and steps S11 and S12 correspond to a process that is executed by the CPU block 11 or the I/O block 14.

For example, if one of the addresses input to the address connecting apparatus 13 from the CPU block 11-$j$ and the I/O block 14-$j$ is selected as in the case shown in FIG. 3, the selected address is output to the CPU block 11-$j$ as the snoop address, and is also input to the snoop circuit 132-$j$. The step S1 inputs this snoop address to the snoop circuit 132-$j$. The step S2 decides whether the I/O block 14-$j$ is to respond with respect to the access request, that is, whether the access request has hit, based on the command type of the snoop address that is input and the address range information 204 that is held within the snoop circuit 132-$j$. If there is no need for the I/O block 14-$j$ to respond and the decision result in the step S2 is NO, the step S3 outputs a no hit response, as the cache status, to the CPU block 11-$j$ via the cache status combining part 137, and the process returns to the step S1.

On the other hand, if the access request has hit and the decision result in the step S2 is YES, the step S4 outputs a hit response, as the cache status, to the CPU block 11-$j$ via the cache status combining part 137. According to an aspect of the invention, the snoop circuit 132 can inform the I/O block that the snoop circuit has already responded to the CPU block 11 for the access request. In addition, with respect to the cache status that made the hit response with respect to the corresponding I/O block 14$j$, the step S5 decides whether or not no access prohibit from other CPU blocks has occurred, that is, whether or not a global hit has occurred. In particular, the access prohibit deciding or judging is based upon the cache status returned (input) to the cache status combining part 137 of the address connecting apparatus 13, from/by the CPU block 11-$j$ in response to the snoop address input to the address connecting apparatus 13 and output (broadcasted) to the CPU block 11-$j$ after being selected by the selection circuit 136 of the address connecting apparatus 13 (see FIG. 3). If an access prohibit from another CPU block exists (no global hit occurred) and the decision result in the step S5 is NO, the process returns to the step S1. On the other hand, if no access prohibit from another CPU block exists (global hit has occurred) and the decision result in the step S5 is YES, the step S6 generates the access request for the corresponding I/O block 14-$j$, and actually outputs the generated access request to this I/O block 14-$j$, via the request generating part 203 for generating the access request for I/O block 14-$j$.

The step S7 decides whether or not the generated request is a configuration access including the data related to the address snoop process. If the decision result in the step S7 is YES, the step S8 holds the data or, copies and holds the data, within the snoop circuit 132-$j$, and the process returns to the step S1. The address snoop process that is carried out thereafter is made according to the new setting made by the data held in the step S8.

If the decision result in the step S7 is NO, the steps S11 and S12 are carried out based on a judgment made by the CPU block 11-$j$ or the I/O block 14-$j$, and not by the address connecting apparatus 13. This judgment is made at the time of receiving the cache status in the case of the CPU block 11-$j$, and at the time of receiving the request in the case of the I/O block 14-$j$, and the processing order has no relation to the configuration operation in the process shown in FIG. 5. More particularly, step S11 decodes the contents of the command, and judges whether the data transfer is required. For example, among the commands, there are commands that include data within the access request (packet). In the case of such commands, no data transfer using the data connecting apparatus 12 is generated. A configuration access request corresponds to this type of command by including configuration data within the access request (packet) to the I/O block 14. If the decision result in the step S11 is NO, the process returns to the step S1. On the other hand, if the decision result in the step S11 is YES, the step S12 carries out an output operation with respect to the data connecting apparatus 12 from the CPU or I/O that holds the data. In other words, the data is output from the I/O block 14 from which the data is read in the case of a read command, and the data is output from the CPU block 11 to which the data is written in the case of a write command.

The present invention is suitably applicable to a case where a large number of I/O blocks are to be implemented in a multi-processor system, independently of the processor blocks. The center snooping embodiments described herein, obviate additional signal(s) required for an address snoop process between an address connecting apparatus and each I/O block in a multiprocessor system, which decreases a number of pins per LSI within the address connecting apparatus and the I/O blocks, decreases or lowers memory access latency (enables high frequency operation or improves upper limit of performance of the multiprocessor system), increases reliability, relaxes constraints on I/O block placement, and reduces costs. More particularly, the present invention provides address snoop methods and multi-processor systems to enable easy implementation of a large number of I/O blocks in the multi-processor system, independently of processor blocks, and to prevent the upper limit of the performance of the multi-processor system from deteriorating (prevent latency from increasing). An address snoop method for a multi-processor system having a structure in which a plurality of processor blocks each having a plurality of processors and a plurality of memories are coupled to a plurality of input and output (I/O) blocks via an address connecting apparatus, is configured to carry out an address snoop process that judges whether to respond with respect to an access request, in the address connecting apparatus in place of each I/O block, when the access request is generated from an arbitrary one of the processor blocks.

According to the embodiments described herein, the center snooping moves I/O snoop control into a snoop bus by executing a snoop for an I/O block 14 in an address crossbar 13, which reduces bandwidth and broadcasts between the address crossbar and the I/O blocks 14, which in turn can reduce number of signal pins in chipsets of an address crossbar 13 and I/O blocks 14, and reduce memory access latency by the CPU blocks 11. The I/O snoop control can be moved into the address crossbar 13 to implement a snoop bus by caching in the address crossbar 13 target addresses and providing snoopers in the address crossbar 13, which do not require large memory and can be efficiently provided in the address crossbar 13.

Therefore, although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An address snoop method for a multi-processor system, having a structure in which a plurality of processor blocks each comprising a plurality of processors and a plurality of memories are coupled to a plurality of input and output (I/O) blocks via an address connecting apparatus, comprising:
    carrying out an address snoop process that judges, in the address connecting apparatus in place of each I/O block, whether to respond to a processor with a snoop address response with respect to an access request, when the access request is generated from an arbitrary one of the processor blocks, wherein the carrying out of the address snoop process further comprises:
    selecting by the address connecting apparatus one of snoop addresses input to the address connecting apparatus from said arbitrary one of the processor blocks and an arbitrary one of the I/O blocks;
    broadcasting by the address connecting apparatus the selected snoop address to said arbitrary one of the processor blocks as a broadcast snoop address; and
    judging by the address connecting apparatus whether said arbitrary one of the I/O blocks needs to respond with respect to the access request, based on a command type of the selected snoop address and address information cached within the address connecting apparatus.

2. The address snoop method as claimed in claim 1, wherein the judging comprises:
    outputting a no hit response to said arbitrary one of the processor blocks, as a snoop address cache status, if said arbitrary one of the I/O blocks does not need to respond; and
    outputting a hit response to said arbitrary one of the processor blocks, as the snoop address cache status, if said arbitrary one of the I/O blocks needs to respond.

3. The address snoop method as claimed in claim 2, wherein the hit response outputting further comprises:
    judging whether an access prohibit from other processor blocks exists according to the broadcasting of the selected snoop address, with respect to the snoop address cache status making the hit response with respect to said arbitrary one of the I/O blocks; and
    generating an access request for said arbitrary one of the I/O blocks and outputting the generated access request to said arbitrary one of the I/O blocks if no access prohibit from the other processor blocks exists according to the broadcasting of the selected snoop address.

4. The address snoop method as claimed in claim 3, wherein the generating of the request further comprises:
    holding data or, copying and holding the data, within the address connecting apparatus if the generated access request is a configuration access that includes configuration data related to the address snoop process, and thereafter carrying out the address snoop process according a new setting made by the configuration data that is held.

5. The method of claim 1, wherein a plurality of address snoop processes are provided in the address connecting apparatus, each address snoop process corresponding to one of the plurality of the I/O blocks, and the method further comprises:
    defining a plurality of partitions, each partition formed by at least one processor block, at least one I/O block, and each address snoop process corresponding to said at least one I/O block.

6. A multi-processor system comprising:
    a plurality of processor blocks each comprising a plurality of processors and a plurality of memories;
    an address connection apparatus; and
    a plurality of input and output (I/O) blocks that are coupled to the processor blocks via the address connecting apparatus,
    wherein the address connection apparatus enables an address snoop process that judges whether to respond to a processor with a snoop address response with respect to an access request in place of each I/O block, when the access request is generated from an arbitrary one of the processor blocks,
    wherein the address connection apparatus comprises:
        snoop address cache status generating means for selecting one of snoop addresses input to the address connection apparatus from said arbitrary one of the processor blocks and an arbitrary one of the I/O blocks, and broadcasting the selected snoop address to said arbitrary one of the processor blocks as a broadcast snoop address; and
        means for judging whether said arbitrary one of the I/O blocks needs to respond with respect to the access request, based on a command type of the selected snoop address and address information cached within the address connection apparatus.

7. The multi-processor system as claimed in claim 6, wherein the snoop address cache status generating means outputs a no hit response to said arbitrary one of the processor blocks, as a snoop address cache status, if said arbitrary one of the I/O blocks does not need to respond; and outputs a hit response to said arbitrary one of the processor blocks, as the snoop address cache status, if said arbitrary one of the I/O blocks needs to respond.

8. The multi-processor system as claimed in claim 7, wherein the snoop address cache status generating means judges whether an access prohibit from other processor blocks exists according to the broadcast snoop address, with respect to the snoop address cache status making the hit response with respect to said arbitrary one of the I/O blocks; and generates an access request for said arbitrary one of the I/O blocks and outputting the generated access request to said arbitrary one of the I/O blocks, if no access prohibit from the other processor blocks exists according to the broadcast snoop address.

9. The multi-processor system as claimed in any of claims 6 to 8, wherein:
    the address connection apparatus includes a number of address snoop circuits that carry out the address snoop process, corresponding to a number of said I/O blocks; and
    each partition is formed by at least one processor block, at least one I/O block, and each address snoop circuit corresponding to said at least one I/O block.

10. An apparatus comprising:
    a plurality of computing processor blocks each comprising a plurality of computing processors;
    a plurality of input and output (I/O) blocks;

an address connecting apparatus that communicably connects the plurality of computing processor blocks and the plurality of I/O blocks and outputs an I/O address snoop response to an access request from an arbitrary one of the computing processor blocks instead of an I/O address snoop response by an I/O block, wherein the address connecting apparatus further comprises:

a plurality of center I/O address snoopers, which corresponds to the plurality of I/O blocks, to output the I/O address snoop response instead of the I/O address snoop response by an I/O block;

a plurality of buffers storing snoop I/O addresses input from the computing processor blocks and the I/O blocks;

a snoop I/O address selector selecting a snoop I/O address input from the plurality of buffers to output the selected snoop I/O address to a center I/O address snooper and to broadcast the selected snoop I/O address to the computing processor blocks; and an I/O address snoop cache status combiner, wherein the center I/O address snooper in place of the I/O block outputs an I/O address snoop cache status to the I/O address snoop cache status combiner to combine an I/O address snoop cache status from a relevant computing processor block in response to the broadcasted selected snoop I/O address with the I/O address snoop cache status from the center I/O address snooper, and to output a combined I/O address snoop cache status to the relevant computer processor block.

11. The apparatus of claim 10, wherein the address connecting apparatus further comprises a storage and each center I/O address snooper caches I/O block configuration information transferred from a computing processor block to an I/O block via the address connecting apparatus, and wherein each center I/O address snooper comprises:

a snoop I/O address checker comparing a snoop I/O address input from the snoop I/O address selector with the I/O block configuration information for a relevant I/O block;

an I/O address snoop cache status generator generating an I/O address snoop cache status to the I/O address snoop cache status combiner according to the snoop I/O address checker;

an I/O block definite access request generator generating a definite access request for the relevant I/O block, according to the combined I/O address snoop cache status from the I/O address snoop cache status combiner.

12. The apparatus of claim 11, wherein the snoop I/O address checker outputs a hit I/O address snoop cache status to the I/O address snoop cache status combiner, if the input snoop I/O address is allocated to the relevant I/O block according to the I/O block configuration information, and wherein the I/O address snoop cache status combiner judges whether an access prohibit from other computing processor blocks exists according to the broadcasted snoop I/O address, in response to a hit I/O address snoop cache status, and generates the definite access request for the relevant I/O block, if no access prohibit from the other computing processor blocks exists.

13. The apparatus of claim 11, wherein the I/O block definite access request generator generates a reduced format definite access request for the relevant I/O block that includes only I/O address information, including a command, required by the relevant block, by excluding unnecessary information according to the I/O block configuration information of a center I/O address snooper.

14. An apparatus comprising:

a plurality of computing processor blocks each comprising a plurality of computing processors;

a plurality of input and output (I/O) blocks:

an address connecting apparatus that communicably connects the plurality of computing processor blocks and the plurality of I/O blocks and outputs an I/O address snoop response to an access request from an arbitrary one of the computing processor blocks instead of an I/O address snoop response by an I/O block, wherein the address connecting apparatus further comprises:

a plurality of center I/O address snoopers, which corresponds to the plurality of I/O blocks, to output the I/O address snoop response instead of the I/O address snoop response by an I/O block; and an I/O address snooping controller to control an on/off operation of a center I/O address snooper according to an I/O block command.

* * * * *

UNITED STATES PATENT AND TRADEMARK OFFICE
CERTIFICATE OF CORRECTION

PATENT NO. : 7,418,559 B2
APPLICATION NO. : 11/259605
DATED : August 26, 2008
INVENTOR(S) : Koji Hosoe et al.

It is certified that error appears in the above-identified patent and that said Letters Patent is hereby corrected as shown below:

Title Page, Item (56) Other Publications: after "issued" insert --on--.

Column 11, Line 14, after "system" delete ",".

Column 14, Line 29, change "blocks:" to --blocks;--.

Signed and Sealed this

Twenty-fifth Day of November, 2008

JON W. DUDAS
*Director of the United States Patent and Trademark Office*